US009811335B1

(12) United States Patent
Khainovski et al.

(10) Patent No.: US 9,811,335 B1
(45) Date of Patent: Nov. 7, 2017

(54) ASSIGNING OPERATIONAL CODES TO LISTS OF VALUES OF CONTROL SIGNALS SELECTED FROM A PROCESSOR DESIGN BASED ON END-USER SOFTWARE

(71) Applicant: QuickLogic Corporation, Sunnyvale, CA (US)

(72) Inventors: Oleg Nikitovich Khainovski, Walnut Creek, CA (US); Dan Aizenstros, Thornhill (CA); Randy Ichiro Oyadomari, San Jose, CA (US); Timothy Saxe, Los Altos, CA (US)

(73) Assignee: QuickLogic Corporation, Sunnyvale, CA (US)

( * ) Notice: Subject to any disclaimer, the term of this patent is extended or adjusted under 35 U.S.C. 154(b) by 487 days.

(21) Appl. No.: 14/053,393

(22) Filed: Oct. 14, 2013

(51) Int. Cl.
  *G06F 9/30* (2006.01)
  *G06F 9/45* (2006.01)
  *G06F 15/78* (2006.01)

(52) U.S. Cl.
  CPC ............ *G06F 9/30007* (2013.01); *G06F 8/41* (2013.01); *G06F 8/443* (2013.01); *G06F 8/4434* (2013.01); *G06F 9/30* (2013.01); *G06F 9/30145* (2013.01); *G06F 9/30181* (2013.01); *G06F 9/30196* (2013.01); *G06F 15/7867* (2013.01)

(58) Field of Classification Search
  None
  See application file for complete search history.

(56) References Cited

U.S. PATENT DOCUMENTS 4,651,275 A * 3/1987 McDonough ......... G06F 9/3802
  712/208
4,879,646 A * 11/1989 Iwasaki ............... G06F 11/3648
  712/227
5,696,956 A * 12/1997 Razdan ................. G06F 9/3879
  700/2

(Continued)

OTHER PUBLICATIONS

'Organization of Computer Systems: § 4: Processors' by M.S. Schmalz, from Organization of Computer Systems: Processor & Datapath, archived on Sep. 27, 2012.*

(Continued)

*Primary Examiner* — Steven Snyder
(74) *Attorney, Agent, or Firm* — Silicon Valley Patent Group LLP (57) ABSTRACT

End-user software is used to select lists of values of control signals from a predetermined design of a processor, and a unique value of an opcode is assigned to each selected list of values of control signals. The assignments, of opcode values to lists of values of control signals, are used to create a new processor design customized for the end-user software, followed by synthesis, place and route, and netlist generation based on the new processor design, followed by configuring an FPGA based on the netlist, followed by execution of the end-user software in customized processor implemented by the FPGA. Different end-user software may be used as input to generate different assignments, of opcode values to lists of control signal values, followed by generation of different netlists. The different netlists may be used at different times, to reconfigure the same FPGA, to execute different end-user software optimally at different times.

33 Claims, 6 Drawing Sheets

(56) References Cited

U.S. PATENT DOCUMENTS

| | | | |
|---|---|---|---|
| 5,752,035 A * | 5/1998 | Trimberger | G06F 8/447 712/229 |
| 5,794,062 A * | 8/1998 | Baxter | G06F 8/447 710/317 |
| 5,812,425 A | 9/1998 | Lee et al. | |
| 5,812,856 A * | 9/1998 | Halahmi | G06F 9/30145 700/33 |
| 6,058,469 A * | 5/2000 | Baxter | G06F 8/447 712/229 |
| 6,182,206 B1 * | 1/2001 | Baxter | G06F 8/447 712/227 |
| 6,223,144 B1 * | 4/2001 | Barnett | G06F 11/3664 703/14 |
| 6,477,683 B1 | 11/2002 | Killian | |
| 6,594,752 B1 * | 7/2003 | Baxter | G06F 8/447 712/227 |
| 6,883,084 B1 * | 4/2005 | Donohoe | G06F 9/3001 712/1 |
| 6,961,842 B2 * | 11/2005 | Baxter | G06F 8/447 712/229 |
| 7,437,700 B2 | 10/2008 | Wang | |
| 7,493,472 B2 * | 2/2009 | Baxter | G06F 8/447 712/229 |
| 7,971,197 B2 | 6/2011 | Goodwin | |
| 8,161,432 B2 | 4/2012 | Wang | |
| 2004/0107331 A1 * | 6/2004 | Baxter | G06F 8/447 712/15 |
| 2005/0268070 A1 * | 12/2005 | Baxter | G06F 8/447 711/203 |
| 2007/0067380 A2 * | 3/2007 | Bishop | G06F 9/3885 708/501 |
| 2010/0287359 A1 * | 11/2010 | Norden | G06F 9/30174 712/210 |
| 2013/0275721 A1 * | 10/2013 | Lin | G06F 9/3016 712/208 |
| 2014/0082334 A1 * | 3/2014 | King | G06F 9/30156 712/226 |

OTHER PUBLICATIONS

'A Functional Reconfigurable Architecture and Compiler for Adaptive Computing' by Peter M. Athanas, copyright 1993, IEEE.*

'Determining the Optimum Extended Instruction-Set Architecture for Application Specific Reconfigurable VLIW CPUs' by C. Alippi et al., copyright 2001, IEEE.*

'Reconfigurable Instruction Set Processors from a Hardware/Software Perspective' by Francisco Barat, IEEE Transactions on Software Engineering, vol. 28, No. 9, Sep. 2002.*

'Supporting FPGA Microprocessors through Retargetable Software Tools' by David A. Clark and Brad L. Hutchings, copyright 1996, IEEE.*

'The Flexibility of Configurable Computing' by John Villasenor and Brad Hutchings, IEEE Signal Processing Magazine, Sep. 1998.*

'Embedded Microprocessor Systems Design; An Introduction Using the Intel 80C188EB' by Kenneth L. Short, copyright 1998, pp. 41-46, 80-81.*

'What is mnemonic?—Definition from Whatis.com' by Thomas Handy, Jun. 2010.*

'What is Opcode?' from engineersgarage.com, copyright 2012.*

'Fundamentals of Computer Organization and Architecture' by Mostafa Abd-el-Barr and Hesham el-Rewini, copyright 2005 by John Wiley & Sons Inc., pp. 40-46.*

* cited by examiner

ASSIGNING OPERATIONAL CODES TO LISTS OF VALUES OF CONTROL SIGNALS SELECTED FROM A PROCESSOR DESIGN BASED ON END-USER SOFTWARE

BACKGROUND

Inside a processor, an arithmetic logic unit (ALU) is circuitry that is controlled by lines (called "control lines" or "control bus") which carry signals whose values control operations performed by the ALU (e.g. arithmetic and/or logic operations, such as a multiply operation or an exclusive OR operation). Specifically, in a processor that is microprogrammed, a controller generates and places on the control lines of the ALU, a list of values of control signals that specify a basic operation (also called "microoperation") to be performed by the ALU in a single clock cycle. As will be readily apparent, each value of a control signal is placed on a corresponding control line of the ALU. Two examples of microoperations that can be specified to the ALU are: (1) shift data within a register, (2) latch data from an input bus coupled to data memory.

Each microoperation of the type described above is typically identified to the controller of the processor by a microinstruction, which includes multiple fields, e.g. an operand field indicating data to be input to the ALU (also called "read data"), and a control field that determines (directly or indirectly) a list of values of control signals to be applied to the ALU. The control field may be non-encoded in which case the controller places the value of each bit of the control field directly on a corresponding control line of the ALU (e.g. when a bit's value is 1, the corresponding control signal is driven active). Alternatively, the control field can be encoded, whereby a decoder is used to convert an "n" bit value in the control field into a list of "m" values of control signals, each of the "m" values being placed on an appropriate control line of the ALU.

An encoded control field of a microinstruction contains an operational code (hereinafter "microopcode") which is typically different from the operational code (hereinafter "macroopcode") in an instruction (called "machine instruction") of software in binary form to be executed by the processor (also called "end-user software" or "application"). The just-described difference, between a microopcode and a macroopcode may be absent in processors that are not microprogrammed, although each machine instruction thereto also contains an operational code (simply called "opcode").

Regardless of whether a processor is or is not microprogrammed, a value of an operational code that can be used in a machine instruction is typically associated with a mnemonic, e.g. in an instruction set architecture (ISA). The ISA is normally prepared manually, by a human who designs the processor. A human who develops end-user software to be executed by the processor may use the mnemonics (in the ISA) to write instructions in assembly language, which are then converted into machine instructions by an assembler (using a mapping in the ISA, between mnemonics and values of the operational code). Alternatively, the human developer may write end-user software in a high level language, such as C or Matlab, followed by generation of machine instructions by use of a compiler (also based on the mapping in the ISA).

As the number of values of an operational code that are specified in an ISA increase, the width of the operational code increases. For example, a modern ISA may make available to a developer, numerous complex functions each of which can be performed by issuing a single machine instruction (such as an instruction to perform Huffman coding or to perform an operation on a vector). The inventors of the current patent application note that when end-user software does not use a significant subset of the complex functions (e.g. does not use half of the mnemonics in an ISA), there appears to be no way to reduce the width of the operational code, e.g. because the width of the operational code is fixed by the ISA regardless of which values of the operational code are used or unused. Hence, there appears to be a need for a solution, as follows.

SUMMARY

In several aspects of described embodiments, a method and one or more computer(s) use software prepared by one or more human developer(s) (also called "end-user software" or "application(s)"), to select from a predetermined design of a processor, one or more lists of values of control signals to be applied to the processor to execute the end-user software. The method and computer(s) assign a unique value of the operational code to each selected list of control signal values. The assignment of values of operational code to lists of values of control signals are used in the normal manner: to create a new processor design that is customized for the end-user software, followed by synthesis, place and route, and netlist generation based on the new processor design, followed by using the netlist to implement a customized processor in an integrated circuit, followed by execution of the end-user software in the customized processor. Prior to execution, a machine language version (or a microcode version, if the customized processor is microprogrammed) of the end-user software is prepared, to include the operational code values used in the just-described assignments.

In some embodiments, the integrated circuit includes programmable logic, e.g. a field programmable gate array (FPGA). In such embodiments, different end-user software may be used as input, to generate different assignments of operational code values to lists of values of control signals, followed by generation of different netlists. The different netlists may be used at different times, to reconfigure the same integrated circuit (e.g. the same FPGA), to execute different end-user software optimally at each of the different times.

It is to be understood that several other aspects and embodiments will become readily apparent to those skilled in the art from the description herein, wherein it is shown and described various aspects by way of illustration. The drawings and detailed description below are to be regarded as illustrative in nature and not as restrictive.

DETAILED DESCRIPTION

Figure 1:
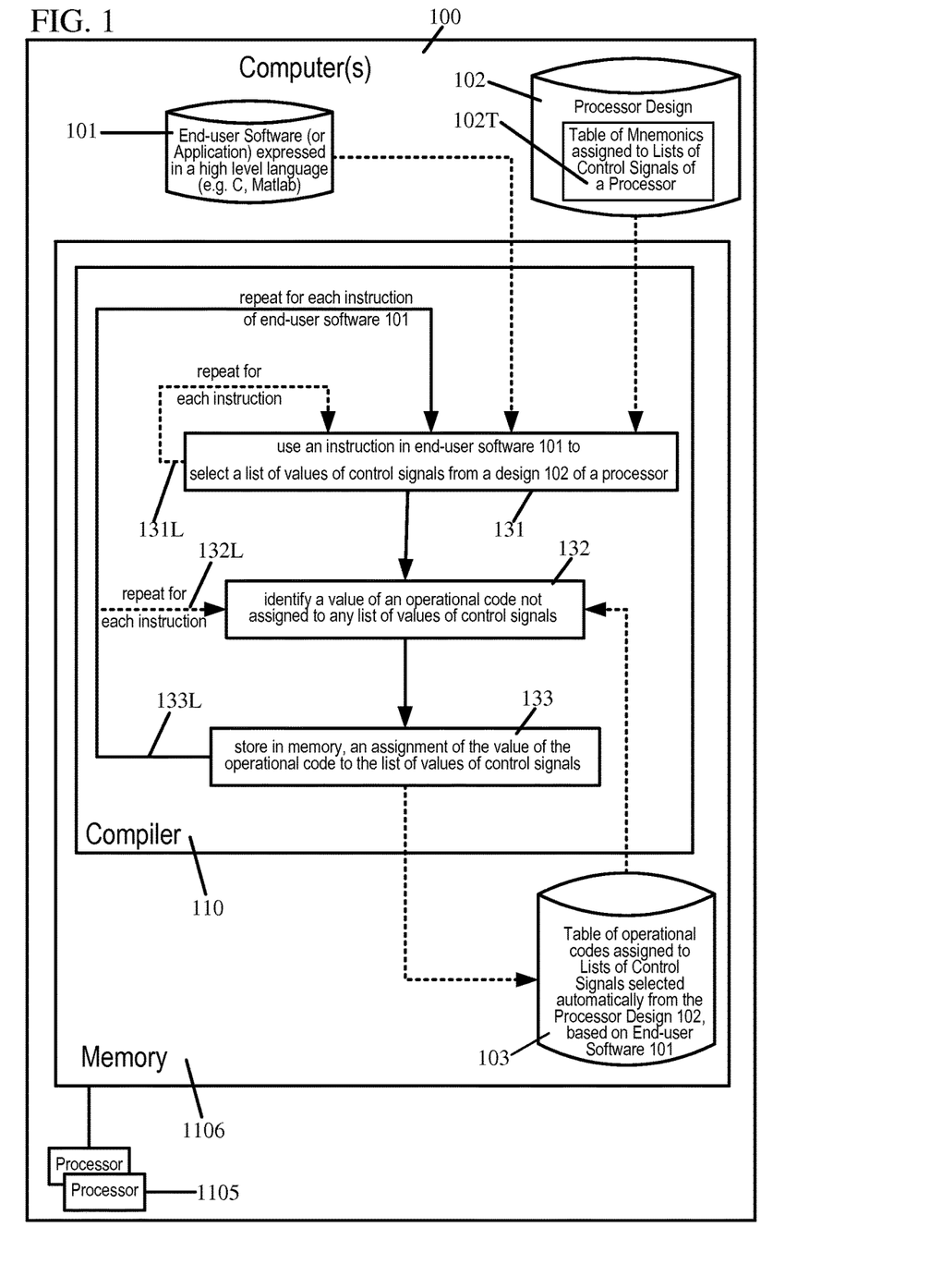
FIG. 1 illustrates, in a high level flow chart, acts performed by a compiler 110 executing in one or more computer(s) 100 in accordance with the invention.

In several embodiments of the type described herein, one or more computer(s) 100 is/are programmed with a compiler 110 to perform a method to use an instruction in end-user software 101 that is expressed in a human-understandable language (e.g. C or Matlab or Assembly), to select a list of values of control signals from a predetermined design 102 of a processor (also called "generic processor"), e.g. as illustrated by act 131 in FIG. 1. A specific manner in which act 131 (FIG. 1) is implemented by computer(s) 100 can be different, depending on the embodiment. For example, in some embodiments, each instruction of end-user software 101 includes a mnemonic.

In several such embodiments, act 131 performs a look up of a predetermined table 102T, using the mnemonic as an input thereto, to identify one or more lists of values of control signals needed to perform the instruction of end-user software 101. Table 102T maps each mnemonic among multiple mnemonics defined for invoking operations of an ALU in the processor design 102, to one or more lists of values of control signals to be applied to the ALU. Thus the ALU is designed to perform a specific operation (which may be a microoperation in case of microprogrammed processors), to at least partially execute the instruction of end-user software 101, in response to a list of values of control signals being applied thereto. In this manner, by using table 102T, several such embodiments eliminate the use of a predetermined Instruction Set Architecture (ISA), i.e. do not map ahead of time, each mnemonic to an operational code. Instead, in such embodiments, table 102T maps each mnemonic directly to a list of value of control signals of the ALU. Alternative embodiments do use a predetermined ISA, in addition to table 102T as described herein.

In certain embodiments of the type described above, act 131 may be performed repeatedly in a tight loop 131L (FIG. 1) prior to performance of act 132 (described below), thereby to identify all lists of values of control signals to be applied to the ALU to execute end-user software 101. The just-described embodiments may perform acts 132 and 133 (described below) based on a frequency of use of each list of values of control signals. In other embodiments, instead of loop 131L, an overall loop 133L is performed over the sequence of acts 131, 132 and 133. In such other embodiments, each instruction in end-user software 101 is processed by acts 131-133, followed by processing of a subsequent instruction therein. Thus, whichever instruction happens to occur first in end-user software 101 is processed by each of acts 131-133, followed by similar processing of whichever instruction happens to occur second in end-user software 101, followed by similar processing of whichever instruction happens to occur third in end-user software 101, and so on.

In act 132, regardless of an order in which instructions of end-user software 101 are processed, the one or more computer(s) 100 are programmed by compiler 110 to identify a value of an operational code that has not yet been assigned to any list of values of control signals. A specific manner in which act 132 (FIG. 1) is implemented by computer(s) 100 can be different, depending on the embodiment. For example, some embodiments maintain a local store which identifies a value of the operational code which has been most recently assigned, and act 132 (FIG. 1) is implemented by simply incrementing the stored value. In such embodiments, the value 0 is assigned when act 132 is first performed, followed by assignment of value 1 when act 132 is next performed, followed by assignment of value 2 and so on. Alternative embodiments of act 132 may access a table 103 (FIG. 1), which holds all values of operational code that have been assigned (for use in binary form of end-user software 101), and use any predetermined method to identify an unused value (by use of table 103).

The one or more computer(s) 100 are programmed by compiler 110 to perform after act 132, an act 133 to store in memory 1106, specifically in table 103, an assignment of the unused value of the operational code identified in act 132 to the list of values of control signals identified in act 131. A specific manner in which act 133 (FIG. 1) is implemented by computer(s) 100 can be different, depending on the embodiment. For example, in some embodiments, the value of the operational code is used as an index into table 103, and the list of values of control signals is written at a specific memory location identified based on the value of the operational code. In other embodiments, table 103 is implemented by a two-element linked list, wherein a first element holds the list of values of control signals, and a second element holds the value of the operational code assigned thereto.

After performance of act 133, if there are additional instructions in end-user software 101, the one or more computer(s) 100 are programmed by compiler 110 to return to act 131 (described above), unless act 131 has been already performed repeatedly as per branch 131L in which case computer(s) 100 return from act 133 to act 132 via branch 132L. In view of branches 131L, 132L and 133L described above and illustrated in FIG. 1, acts 131, 132 and 133 can be performed in many different ways, depending on the embodiment. On completion of performance of acts 131-133 on end-user software 101, all lists of values of control signals that are needed to operate the ALU in processor design 102 in order to execute end-user software 101 are identified in table 103 along with their corresponding operational codes.

Figure 2A:
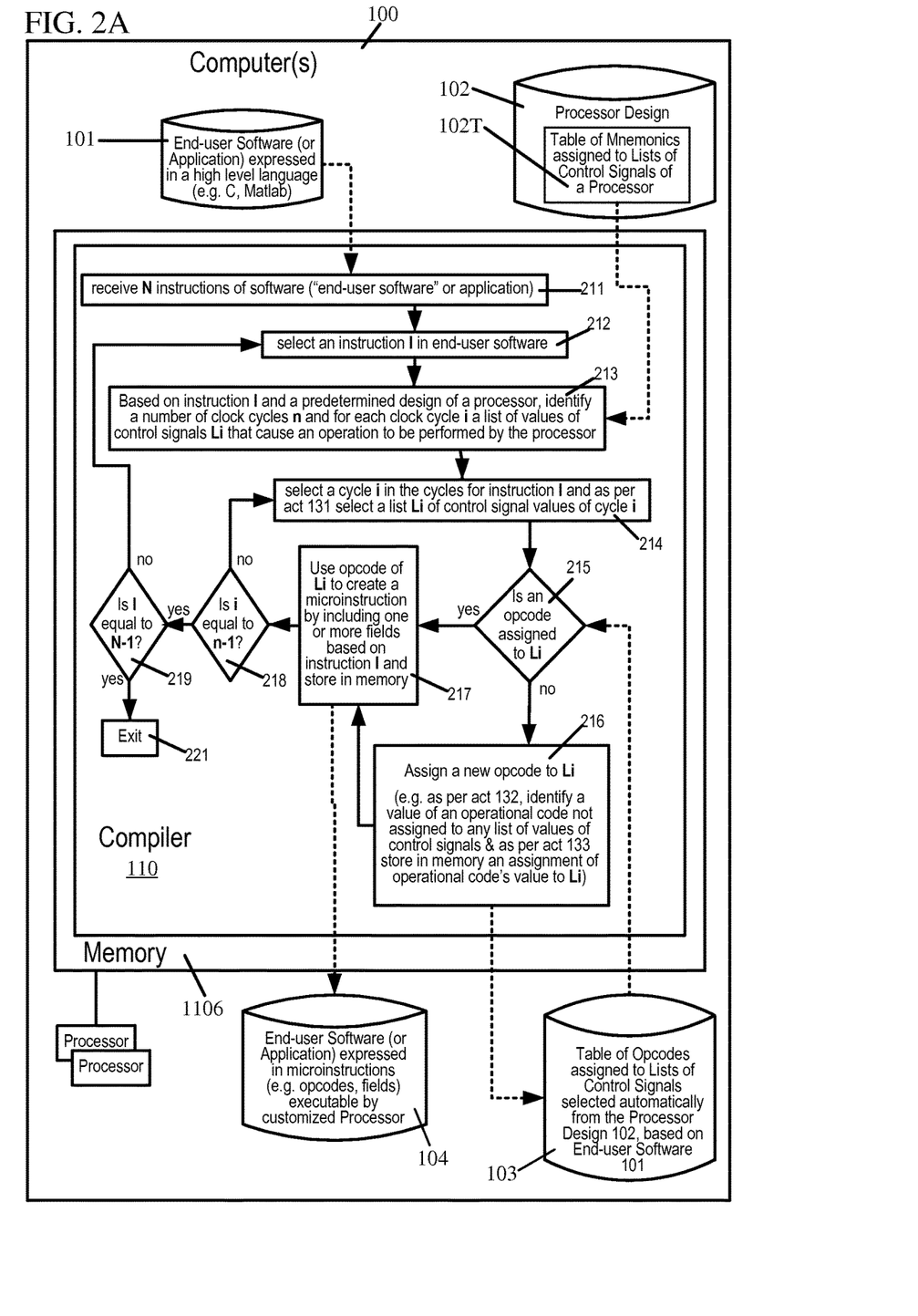
FIG. 2A illustrates, in an intermediate level flow chart, acts performed by compiler 110 of FIG. 1 in some illustrative embodiments.
Figure 2B:
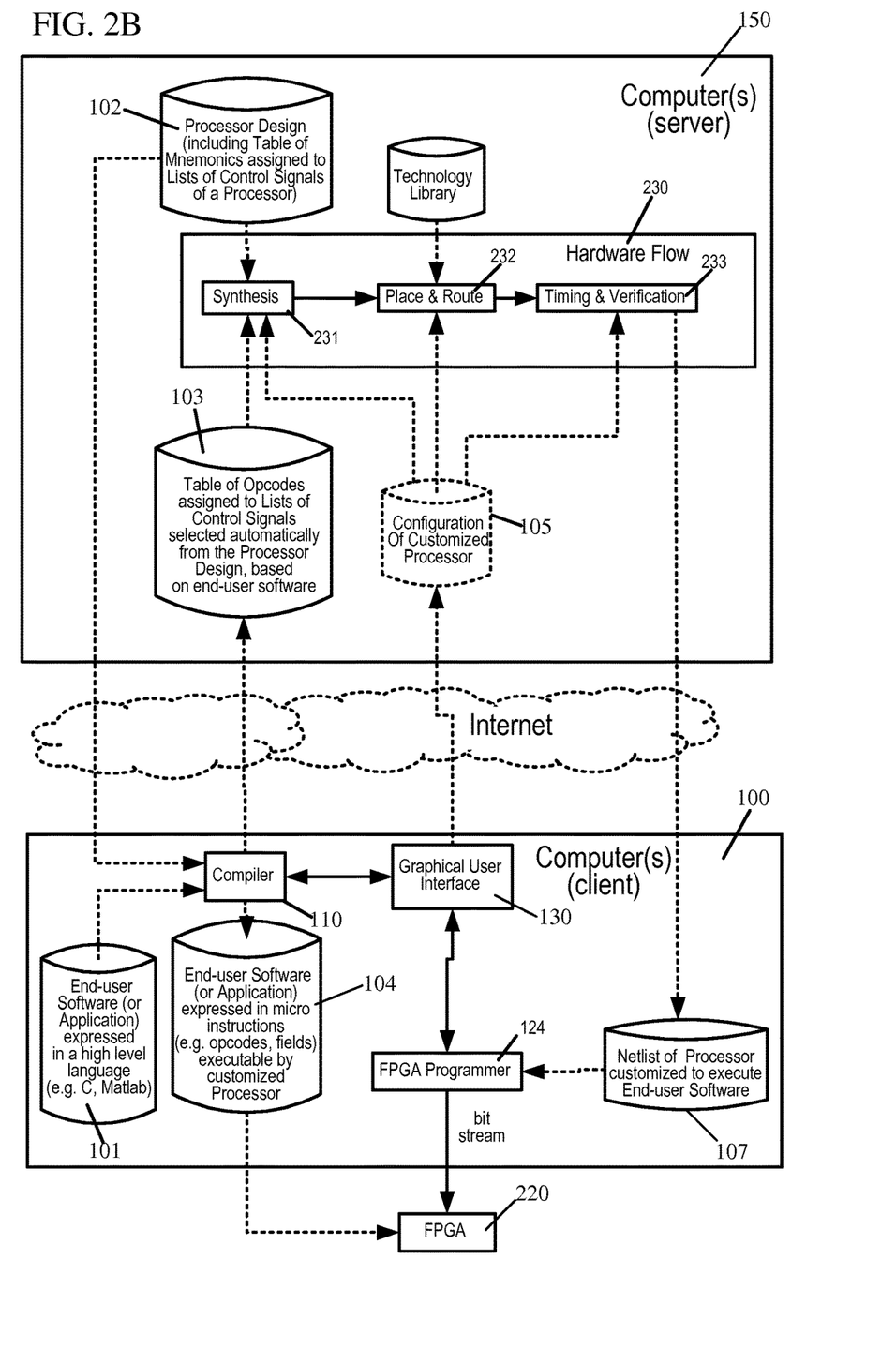
FIG. 2B illustrates, in a block diagram, data flow between the one or more computer(s) 100 of FIG. 2A used as a client, and one or more computer(s) 150 used as a server in the illustrative embodiments.

Table 103 that is generated by compiler 110 (FIG. 1) is used in several embodiments (1) to generate a binary form 104 (FIG. 2A) of end-user software 101, with the end-user software in binary form 104 being expressed in microinstructions, each microinstruction including an operational code and one or more fields, and (2) to create a netlist 107 (FIG. 2B) of a customized processor in an integrated circuit (such as a field programmable gate array, "FPGA") that is capable of executing the microinstructions of end-user software 104. In some embodiments, the end-user software 104 in the form of microinstructions is generated in an interleaved manner with generation of table 103, wherein addition of a first operational code to table 103 is followed by use of that first operational code in generating a microinstruction in end user software 104, followed by addition of a second operational code to table 103 is followed by use of the second operational code in generating another microinstruction in end user software 104, and so on, e.g. as illustrated in FIG. 2A and described below. In other embodiments, table 103 is generated in its entirety by compiler 110 (whereby operational codes are assigned to all lists of values of control signals needed to operate the ALU in processor design 102 to execute end-user software 101), followed by generation of all microinstructions of the end-user software 104. FIG. 2B illustrates generation of netlist 107 based on table 103, regardless of the manner in which table 103 is generated.

Computer(s) 100 of some embodiments are programmed to perform an act 211 (FIG. 2A), to receive end-user software 101. End-user software 101 includes instructions A . . . I . . . N−1, N, wherein N is the total number of instructions. Thereafter, in act 212, computer(s) 100 select an instruction in the end-user software as the current instruction I. As noted above, in some embodiments, current instruction I is selected in a first iteration to be the very first instruction in end-user software 101, thus I=A. In subsequent iterations, each instruction in end-user software 101 that follows the current instruction I is selected in act 212.

After act 212, computer(s) 100 perform an act 213 as follows. In act 213, using current instruction I as an index, computer(s) 100 look up table 102T in processor design 102, to identify a number of clock cycles n and for each clock cycle i therein, a list of values of control signals Li. As noted above, the list of values of control signals Li are designed to cause an ALU in the processor design 102 to perform a specific operation, in clock cycle i.

In one illustrative example, the current instruction I includes the mnemonic ADD which denotes an add instruction in assembly language. On using ADD as an index to lookup, table 102T identifies a required number of clock cycles n to be 2, and further identifies that a first list of values of control signals L1 to be applied to the ALU in the first clock cycle is the following four bytes: 3A4B (expressed in hexadecimal, for convenience), and a second list of values of control signals L2 to be applied to the ALU in the second clock cycle is the following four bytes: 1FE2 (also in hexadecimal). In another illustrative example, the current instruction I includes the mnemonic VADD3, which denotes a vector add instruction in assembly language. In this example, on using mnemonic VADD3 as an index to lookup, table 102T identifies the number of clock cycles n to be 4, and further identifies the following four lists of values of control signals to be applied to the ALU, in four successive clock cycles: 1FE2, 1FE2, 1FE2, BFF4. An illustration of table 102T, which is defined by a human designer of a generic processor described in processor design 102 (i.e. defined ahead of time prior to invocation of compiler 110), is as follows:

| Mnemonic | Number of cycles | Lists of values of control signals |
| --- | --- | --- |
| ADD | 2 | 3A4B, 1FE2 |
| . . . | . . . | . . . |
| LOAD | 2 | BFF4, 4113 |
| . . . | . . . | . . . |
| SUB | 2 | 3A4C, 1FE2 |
| . . . | . . . | . . . |
| VADD3 | 4 | 1FE2, 1FE2, 1FE2, BFF4 |
| . . . | . . . | . . . |

Although table 102T shown above contains mnemonics, table 102T does not contain any operational codes (or opcodes), and thus table 102T does not define any instruction set architecture (ISA). Note that the rows of table 102T may be stored in any order relative to one another, depending on the embodiment, although in some embodiments, the rows are sorted alphabetically by mnemonics, in order to facilitate fast lookup using a mnemonic as input.

After act 213, computer(s) 100 perform an act 214 as follows. In act 214, computer(s) 100 selects a current cycle i from among the number of clock cycles n identified by use of table 102T in act 213. In some embodiments, current cycle i is selected in a first iteration to be the very first clock cycle in the cycles of instruction I. In subsequent iterations, each cycle of instruction I that follows the current cycle i is selected in act 214.

After act 214, computer(s) 100 perform an act 215 as follows. In act 215, using the list of values of control signals Li to be applied to the ALU in clock cycle i, the computer(s) 100 check if an operational code is already assigned thereto in table 103. Initially, for the very first instruction in end-user software 101, table 103 is empty and therefore the answer in act 215 is no. When the answer is no in act 215, computer(s) 100 go to act 216 wherein a new value of the operational code is assigned to the list of values of control signals Li. Specifically, computer(s) 100 perform act 132 (as described above in reference to FIG. 1) to identify an unused value of the operational code and then perform act 133 to store its assignment to the list of values of control signals Li in table 103.

In an illustrative example, table 103 is initially empty, and thus on performing act 216 with a first instruction including the mnemonic ADD, i.e. I=ADD in end-user software 101, and the current cycle i=0, the operational code of value 0 is assigned in table 103 to the list of values of control signals 3A4B (to which the first cycle of mnemonic ADD is assigned, as per table 102T). At this stage in the above described example, table 103 appears as follows:

| Operational Code | Lists of values of control signals |
| --- | --- |
| 0 | 3A4B |

On a second iteration of act 216 for the current instruction with mnemonic ADD, i.e. I=ADD and the current cycle i=1, the list of values of control signals 1FE2 (to which the second cycle of mnemonic ADD is assigned, as per table 102T), and as there is no entry for 1FE2 in table 103 (above), the most-recently used operational code of value 0 is incremented to 1 in act 132, and this value 1 is assigned in table 103 to the list of values of control signals 1FE2, as follows:

| Operational Code | Lists of values of control signals |
| --- | --- |
| 0 | 3A4B |
| 1 | 1FE2 |

In the illustrative example, the second instruction in end-user software 101 is VADD3, and thus in the next three iterations of act 215, the current instruction I=VADD3 (see table 102T above which identifies 4 clock cycles). In each of the three clock cycles i=0, i=1, and i=2 for the current instruction I=VADD3, the list of values of control signals remains the same, namely 1FE2 (as per table 102T above). Thus in each of these three iterations of act 215, computer(s) 100 find that table 103 already contains the current list of values of control signals Li, namely 1FE2 Hence, in each of these three iterations of act 215 (for the three clock cycles i=0, i=1, and i=2 of the current instruction I=VADD3), table 103 is kept unchanged. In a fourth clock cycle, i=3 for the current instruction I=VADD3, the list of values of control signals becomes BFF4 (as per table 102T above), and computer(s) 100 find that there is no entry for BFF4 in table 103 and thus increment the most-recently used operational code of value 1 to 2 in act 132, and then assign this value 2 (in a new row in table 103) to the list of values of control signals BFF4, as follows:

| Operational Code | Lists of values of control signals |
|---|---|
| 0 | 3A4B |
| 1 | 1FE2 |
| 2 | BFF4 |

In the illustrative example, a third instruction in end-user software 101 includes the mnemonic LOAD, and thus in the next two iterations of act 215, the current instruction I=LOAD (see table 102T above which identifies 2 clock cycles). In a first clock cycle i=0 for the current instruction I=LOAD, the list of values of control signals is BFF4 (see table 102T above) is found to be already present in table 103 (see above), and thus table 103 remains unchanged. In the second clock cycle i=1 for the current instruction I=LOAD, the list of values of control signals is 4113 (see table 102T above) for which there is no entry in table 103, and thus a new entry is added for it in act 216, after identifying a new value 3 of the operational code (by incrementing the most-recently used value 2):

| Operational Code | Lists of values of control signals |
|---|---|
| 0 | 3A4B |
| 1 | 1FE2 |
| 2 | BFF4 |
| 3 | 4113 |

As illustrated by table 103 in the previous paragraph, all of the lists of values of control signals therein are selected based on instructions in end-user software 101. Thus, when the compiler 110 finishes processing end-user software 101, table 103 holds the smallest range of values of operational code that are needed to operate the ALU in processor design 102 in order to execute the entirety of end-user software 101. In the above-described example, if the end-user software has only the above-described three instructions (which use the mnemonics ADD, VADD3, and LOAD), only four values of the operational code are needed (namely the values 0, 1, 2 and 3). Thus these four values of the operational code are represented by just two bits. In this manner, the size of the range of values of the operational code needed to execute the entirety of end-user software 101 is made significantly smaller than, for example, the number of entries in table 102T (e.g. $2^{32}$ entries), which depends on the number of mnemonics defined, which in turn depends on the number of instructions supported by processor design 102.

As will be apparent in view of the example described above, the values of operational code that are assigned to the list of values of control signals in table 103 depends on the mnemonics used in the instructions of end-user software 101. Thus, if the mnemonic ADD is not used in a different end-user software (e.g. for a different application) the table 103 generated therefrom will not have any entry for the list of values of control signals 3A4B, and the first value 0 of the operational code may be assigned to whatever happens to be the first assembly language instruction in this different end-user software.

Prior to storing an assignment in act 216, the computer(s) 100 check (as per act 215), whether the list of values of control signals has already assigned thereto in table 103, any value of the operational code. In act 215, if table 103 indicates that an operational code is already assigned to the list of values of control signals Li, the computer(s) 100 go to act 217 (described below). Hence in the above-described example, in each of the current cycles i=0, i=1, and i=2, the computer(s) 100 go from act 215 to act 217 (described below). Note that on completion of act 216 as well, the computer(s) 100 go to act 217.

In act 217, computer(s) 100 use the operational code assigned to the list of values of control signals Li, to create a microinstruction and store the microinstruction in memory as a portion of end-user software 104 (which is expressed in microinstructions). The microinstruction is created in act 217 to include the value of the operational code, and values in one or more fields based on values in fields of the instruction in the end-user software.

In an illustrative example, end-user software 101 in assembly language has the following assembly instruction: 1030=ADD (1010, 1020), wherein ADD is a mnemonic for adding the input operands, and 1010 and 1020 are input operands identifying memory locations from which data is to be read, and 1030 is an output operand identifying a memory location to which data is to be written. In the illustrative example, the just-described assembly language instruction is used in act 217 to generate for the first cycle i=0, the following microinstruction: 0, 1010, 1020, x, wherein the value 0 is the value of the operational code assigned in table 103 to the list of values of control signals 3A4B (which in turn is associated with the first cycle of mnemonic ADD, in table 102T), and x denotes a don't care value. In a next iteration, this same assembly language instruction is used in act 217 to generate for the second cycle i=1, the microinstruction: 1, x, x, 1030, wherein the value 1 is the value of the operational code assigned in table 103 to the list of values of control signals 1FE2 (which in turn is associated with the second cycle of mnemonic ADD, in table 102T) and x denotes a don't care value.

In some embodiments, the microinstructions are pipelined, whereby the input operands of a microinstruction are read in an earlier clock cycle, and/or the output operand of the microinstruction are written in a subsequent clock cycle. A pipelining example is now described, in which table 102T has the following list of values of control signals:

| Mnemonic | Number of cycles | Lists of values of control signals |
|---|---|---|
| ADD | 2 | 1400, 0134 |
| ... | ... | ... |
| SUB | 2 | 1400, 0144 |
| ... | ... | ... |

When an end-user software 101 includes an instruction including the mnemonic ADD (also called "first instruction") followed immediately by an instruction including the mnemonic SUB (also called "second instruction"), and when the list of values of control signals 1400 refer to memory actions that are independent of operations specified by the the list of values of control signals 0134, then the first cycle of the second instruction (which includes the mnemonic SUB) is merged with the last cycle (i.e. the second cycle) of the first instruction to implement pipelining. In the just-described example, although the sequence 1400, 0134, 1400, 0144 is obtained initially on replacement of mnemonics, after pipelining the sequence becomes 1400, 1534, 0144. In this manner, by pipelining one microinstruction is eliminated (i.e. optimized away by compiler 110) when the instruction ADD is followed by instruction SUB in the end-user software 101. A specific manner in which pipelining is implemented is different in different embodiments, and not a critical aspect in some embodiments, while other embodiments do not pipeline.

On completion of act 217, computer(s) 100 go to act 218 to check if the current cycle i is equal to n−1 and if not, computer(s) 100 go to act 214 (described above), thereby to loop until all n clock cycles of the current instruction I have been processed at which time the yes branch is taken to go to act 219.

In act 219, computer(s) 100 check if the current instruction I is equal to N−1 and if not, computer(s) 100 go to act 212 (described above), thereby to loop until all N instructions of the end-user software 101 have been processed at which time the yes branch is taken, to exit the loop in act 221. During exit in act 221, the end-user software 104 and the table 103 of opcodes that have been generated by compiler 110 are written to files in appropriate directories, on non-volatile storage media, such as one or more disk(s), for use in subsequent processing, as illustrated in FIG. 2B (described below). Note that method of acts 211-220 is performed by compiler 110 without assigning any value of the operational code to a mnemonic or vice versa. Thus, no instruction set architecture (ISA) is used in such embodiments.

In some embodiments, computer(s) 150 operate as a server, and supply to client computer(s) 100, one or more portions of processor design 102. Specifically, certain portions of processor design 102, such as the table 102T (described above) are transmitted to compiler 110, for use in generation of the table 103. Depending on the embodiment, one or more portions of processor design 102 transmitted to compiler 110 may be expressed in a hardware description language, such as VERILOG or VHDL. In some embodiments, computer(s) 100 transmit table 103 that is generated by compiler 110 to the server computer(s) 150.

Table 103 may also be expressed in the hardware description language, such as VERILOG or VHDL. For example, in some embodiments, compiler 110 generates a description of decode logic to be used with a version of the design of the processor that is to be customized for execution of the end-user software, based on table 103. More specifically, compiler 110 of such embodiments uses each assignment of the value of an operational code to the list of values of control signals to write a hardware description as follows. If a bit i is set in the list of values of control signals, in the jth row of table 103, compiler 110 writes Signal ij=Signal i(j−1)||opcode==j and if the answer is no, compiler 110 writes Signal ij=Signal i(j−1).

Table 103 of the type described above is input to a synthesis tool 231 in a hardware flow 230 implemented by computer(s) 150. Synthesis tool 231 uses table 103 and the processor design 102, to perform synthesis in the normal manner. During synthesis, any portions of the processor design 102 that are not used are eliminated by optimization. Thus, only portions of processor design 102 that are required to operate the ALU on application of the lists of values of control signals in table 103 are retained.

Synthesis is followed by use of a place and route tool 232 and a timing and verification tool 233, resulting in a netlist 107. Netlist 107 is transmitted from server computer(s) 150 to client computer(s) 100 in the normal manner. Thereafter, an FPGA programmer 124 in client computer(s) 100 provides a bitstream to FPGA 220, which becomes configured to implement a processor customized to execute any microinstructions that include operational codes of table 103. Then, end-user software 104 is loaded into the processor implemented in FPGA 220 for execution therein.

Client computer(s) 100 of some embodiments include a graphical user interface 130 that may be used by a human developer of end-user software 101 to invoke compiler 110 and/or FPGA programmer 124. Graphical user interface 130 may additionally be used in some embodiments of computer(s) 100, to obtain user input in the form of configuration information 105 to be input to one or more of synthesis tool 231, place and route tool 232, timing and verification tool 233 for use in generating the netlist 107 of the customized processor.

Figure 3:
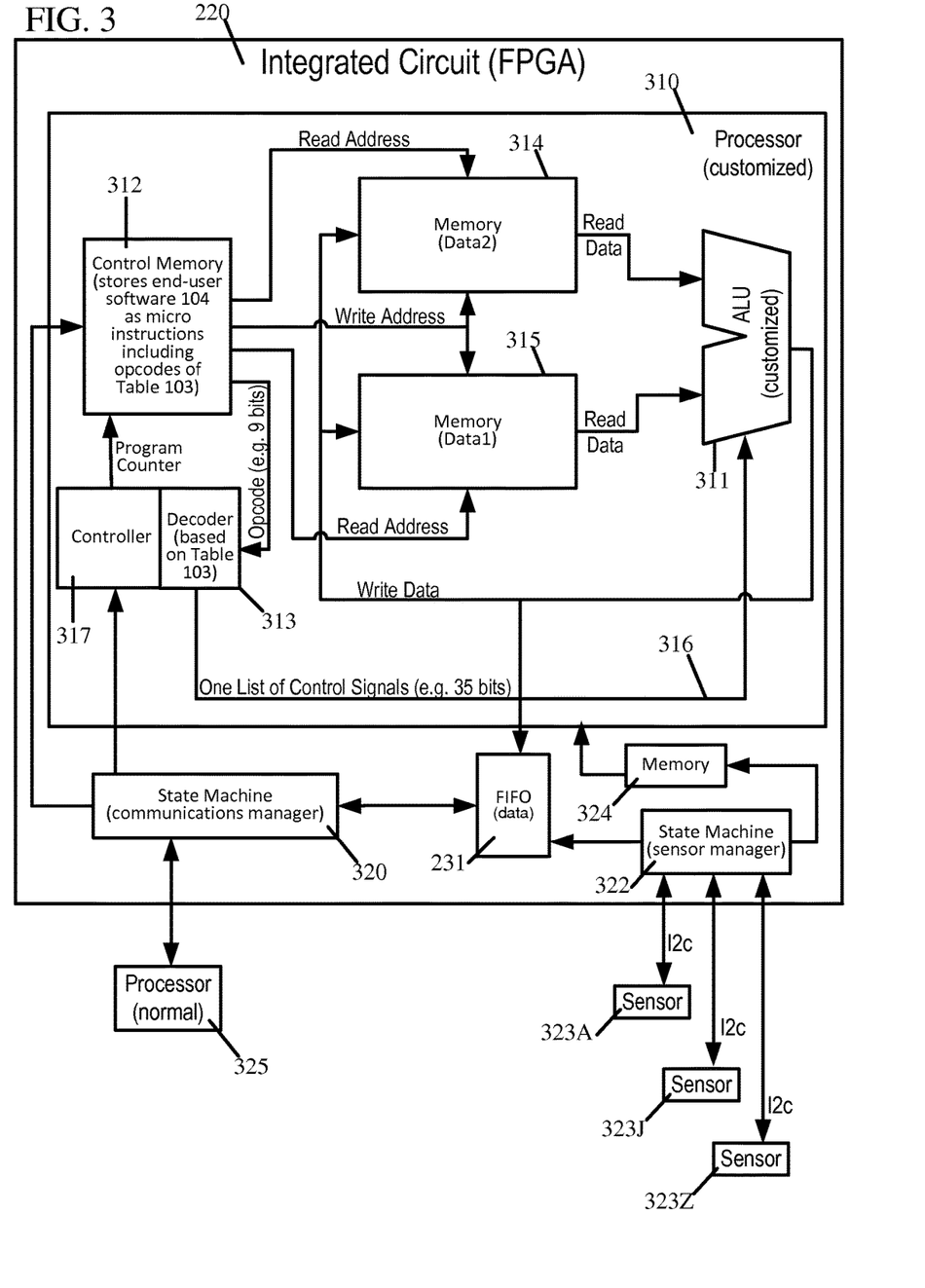
FIG. 3 illustrates, in an block diagram, a processor implemented in a field programmable gate array (FPGA) by use of the methods of FIGS. 2A and 2B in accordance with the invention.

An example of a customized processor that is implemented in an FPGA 220 is illustrated as processor 310 in FIG. 3. Processor 310 includes an ALU 311 that is controlled by a list of values of control signals (e.g. 35 bits wide) applied to control lines 316 by a decoder 313. Decoder 313 operates under the control of a controller 317 that also supplies a program counter to a control memory 312. Control memory 312 in turn supplies an operational code (e.g. 9 bits wide) to decoder 313. Decoder 313 is implemented based on a hardware description of table 103 (described above), which is prepared based on lists of values of control signals identified by use of table 102T, in turn based on mnemonics in instructions in end-user software 101. Control memory 312 holds microinstructions, each of which includes, in addition to the operational code described above, several operands, such as two read addresses applied to memories 314 and 315 (which in turn supply data to ALU 311), and a write address also applied to one of memories 314 or 315 (which store data from ALU 311).

ALU 311 is also coupled (e.g. via its output bus that carries write data) to a First-In-First-Out memory 231 that supplies data therefrom via a state machine 320 to an external device (external to FPGA 220) such as processor 325. Processor 325 loads end-user software 104 into control memory 312 via state machine 320. In addition to state machine 320, the FPGA 220 of some embodiments also includes another state machine 322 that interfaces to external devices, such as sensors 323A . . . 323J . . . 323Z, each accessed via an I2c bus. State machine 322 writes the data from sensors 323A . . . 323J . . . 323Z to a memory 324 read by processor 310, to perform one or more functions thereon. Examples of the types of functions that may be performed by processor 310 include calibration, motion fusion, activity classification and context classification. Use of processor 310 to perform such functions on sensor data offloads the work from processor 325 which can therefore operate in the normal manner (e.g. during day time) or be in a non-operating mode and be woken when processor 310 detects an event that is predetermined as being important (e.g. during night time).

In certain embodiments, the design of processor 310 is changed multiple times in a day during normal operation, as follows. In an illustrative example, at a user-specified time (e.g. 6 am) of each day, processor 325 loads one bitstream (based on one netlist) into FPGA 220 to implement one version of processor 310 tailored to optimally execute a day time version of end-user software 104. In this example, at another user-specified time (e.g. 10 pm) of each day, processor 325 loads another bitstream (based on another netlist) into FPGA 220 to implement another version of processor 310 tailored to optimally execute a night time version of end-user software 104. Thus the same FPGA 220 can be configured (i.e. programmed) two or more times in a day, to implement different processors that support different the lists of values of control signals, and thus execute different end-user software.

When the lists of values of control signals used by the day time version of processor 310 are identical in number (e.g. the number M) to the lists of values of control signals used by the night time version of processor 310, the values of the operational code which are used in these two versions of processor 310 are identical to one another although mapped to different lists of values of control signals. This is because in certain embodiments, during preparation of table 103 for each version of processor 310, the same M values of the operational code are assigned sequentially, starting from 0, followed by 1, followed by 2, followed by 3 and so on (up to M−1). Accordingly, when the lists of values of control signals used by a first version of processor 310 are larger in number (e.g. T in number) than the number (e.g. S) of lists of values of control signals used a second version of processor 310, the S values of operational code used in the second version are a subset of the T values of operational code used in the first version.

In the above-described example, a human developer may choose to use the same width the operational code (e.g. 9 bits wide) in both the night time version of end-user software 104 as well as in day time version of end-user software 104 although the same values of the operational code in each of these two versions may operate ALU 311 differently, e.g. based on different assignments of values of the operational codes to the lists of values of control signals in corresponding versions of table 103. A developer may specify, in some embodiments, different widths of the operational code to compiler 110, e.g. via graphical user interface 130, in which case the compiler 110 generates correspondingly different tables 103, which will eventually result in different netlists 107 wherein correspondingly different widths operational code are to be supplied by control memory 312 to correspondingly different decoders 313 (synthesized by synthesizer 231 based on the different tables 103).

Figure 4:
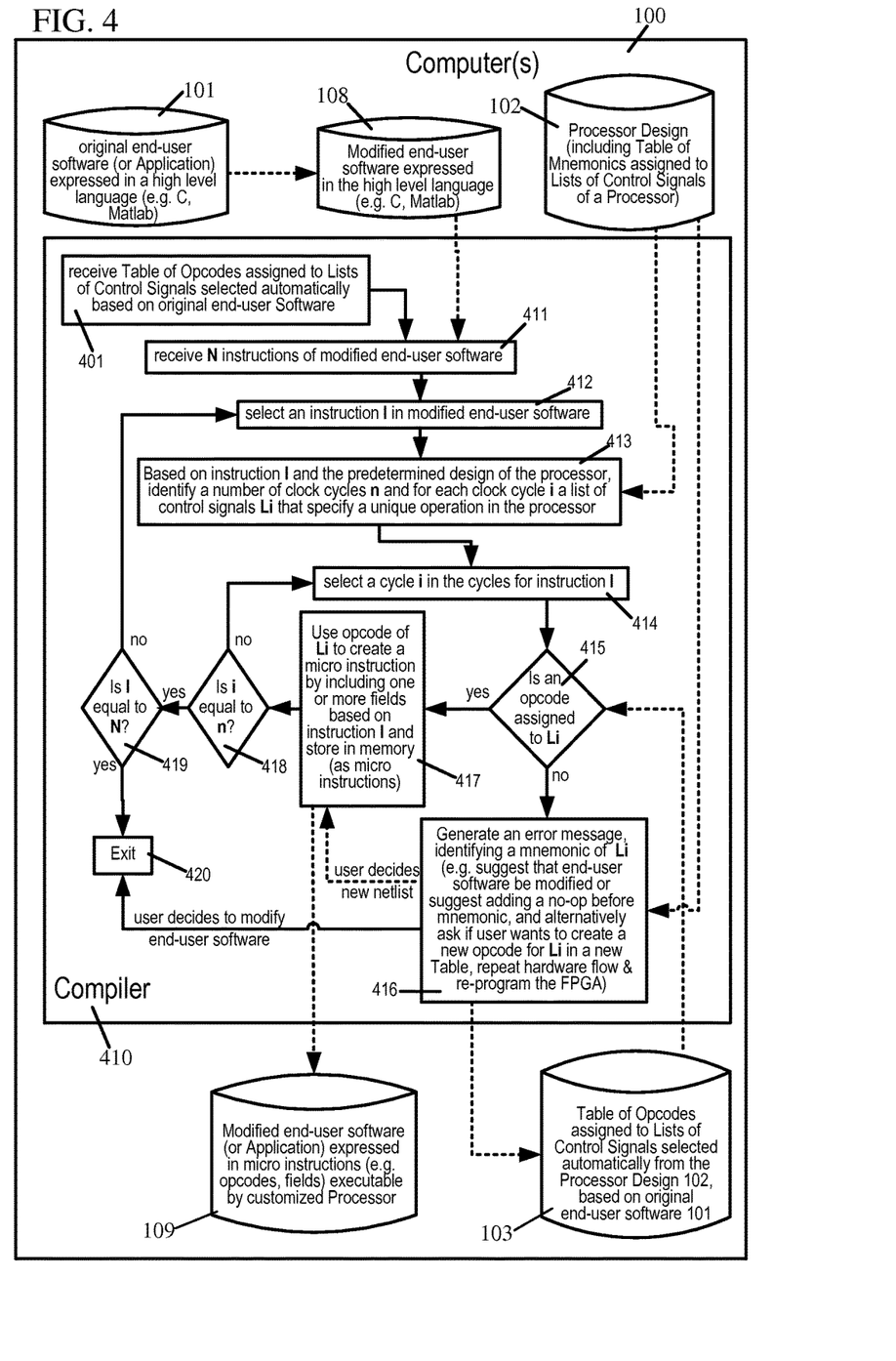
FIG. 4 illustrates, in another intermediate level flow chart, acts performed by a compiler executing in one or more computer(s) 100 similar to FIG. 2A, also in accordance with the invention.

Some embodiments of computer(s) 100 are programmed to support iterative development of end-user software, as illustrated in FIG. 4. Specifically, a human developer of end-user software 101 may generate a modified version 108, e.g. by making one or more changes to end-user software 101 (which is expressed in a human-understandable language, such as any high level language, e.g. C or Matlab). In such embodiments, computer(s) 100 are programmed with a compiler 410 (FIG. 4) to perform an act 401 to receive as input therein, table 103 generated based on the original end-user software 101. Thereafter, computer(s) 100 perform acts 411-415 and 417-420 in a manner similar to acts 211-215 and 217-220 described above. In some embodiments, a single piece of software is used to implement both compilers 110 and 410, although in other embodiments two or more pieces of software may be used.

In act 416 which is performed on the no branch from act 415, computer(s) 100 generate an error message identifying the mnemonic assigned to the list of values of control signals Li as being previously unused (in the original end-user software 101). The mnemonic is identified in act 416 by looking up the table 102T, using as input the list of values of control signals Li. In some embodiments, the error message requests user input, on whether to support the mnemonic (in which case the user is notified that the hardware flow would need to be repeated, followed by re-programming of the FPGA), alternatively whether the end-user software 108 is to be further modified (e.g. by eliminating the mnemonic identified in the error message, or by insertion of a no-op before the mnemonic). Computer(s) 100 perform storing of an assignment of a new operational code to the list of values of control signals Li in response to receipt of user input indicating that the mnemonic is to be supported, followed by going to act 417. Computer(s) 100 exit at act 416, if the user input is to modify the end-user software.

Figure 5:
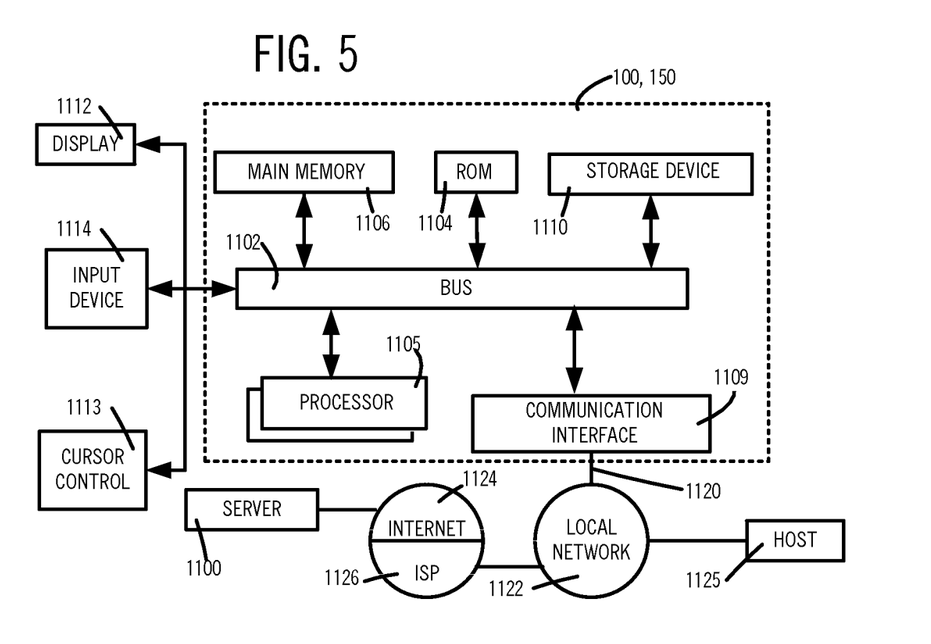
FIG. 5 illustrates, in a block diagram, hardware portions of one or more computers 100, 150 that perform the methods illustrated in FIGS. 2A, 2B and 4 in some embodiments.

The methods of FIGS. 1, 2A, 2B and 4 may be used to program one or more computer(s) 100, 150 each of which may be implemented as illustrated in FIG. 5 which is discussed next. Specifically, each of computers 100, 150 includes a bus 1102 (FIG. 5) or other communication mechanism for communicating information, and one or more processor(s) 1105 coupled with bus 1102 for processing information. Each of computers 100, 150 uses (as the above-described memory) a main memory 1106, such as a random access memory (RAM) or other dynamic storage device, coupled to bus 1102 for storing information and instructions (e.g. to perform the acts of FIGS. 1, 2A, 2B and 4) to be executed by processor 1105.

Main memory 1106 (FIG. 5) also may be used for storing temporary variables or other intermediate information during execution of instructions to be executed by processor 1105. Each of computers 100, 150 further includes a read only memory (ROM) 1104 or other static storage device coupled to bus 1102 for storing static information and instructions for processor 1105, such as software in the form of a browser, an instant messenger, timecard module, task management module and/or integration software. A storage device 1110, such as a magnetic disk or optical disk, is provided and coupled to bus 1102 for storing information and instructions.

Each of computers 100, 150 (FIG. 5) may be coupled via bus 1102 to a display device or video monitor 1112 such as a cathode ray tube (CRT) or a liquid crystal display (LCD), for displaying information to a computer user (e.g. a store manager) may be displayed on display 1112. An input device 1114, including alphanumeric and other keys (e.g. of a keyboard), is coupled to bus 1102 for communicating information (such as user input) to processor 1105. Another type of user input device is cursor control 1113, such as a mouse, a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane. In addition to display device 1112, computer 100 may include a speaker (not shown) as another output device for use by processor 1105.

As described elsewhere herein, compiler 110 may be implemented in computer 100 (FIG. 5) by processor 1105 executing one or more sequences of one or more instructions that are contained in main memory 1106. Such instructions may be read into main memory 1106 from another non-transitory computer-readable storage medium, such as storage device 1110. Execution of the sequences of instructions contained in main memory 1106 causes processor 1105 in one or more of computers 100, 150 to perform the operations of a process described herein and illustrated in FIGS. 1, 2A, 2B and 4. In alternative embodiments, hard-wired circuitry may be used in place of or in combination with software instructions that when executed implement the compiler 110.

The term "non-transitory computer-readable storage media" as used herein refers to any non-transitory storage media that participates in providing instructions to processor 1105 for execution. One or more such non-transitory computer-readable storage media may take many forms, including but not limited to (1) a non-volatile storage medium, and (2) a volatile storage medium. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by either or both of computers 100, 150. Volatile storage media includes dynamic memory, such as main memory 1106 which may be implemented in the form of a random access memory or RAM.

Instructions of a compiler 110 to be executed by processor 1105 can be provided by a transmission link or by a non-transitory storage medium from which a computer 100 can read information, such as data and/or code. Specifically, various forms of transmission link and/or non-transitory storage medium may be involved in providing one or more sequences of one or more instructions to processor 1105 for execution. For example, the instructions may initially be comprised in a non-transitory storage device, such as a magnetic disk, of a server computer 150. The server computer 150 can load the instructions into its dynamic memory (RAM) and send the instructions over a telephone line using a modem to computer 100.

A modem local to each of computers 100, 150 (FIG. 5) can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Each of computers 100, 150 (FIG. 5) also includes a communication interface 1109 coupled to bus 1102. Communication interface 1109 provides a two-way data communication coupling to a network link 1120 that is connected to a local network 1122. Local network 1122 may interconnect multiple computers (as described above). For example, communication interface 1109 may be an integrated services digital network (ISDN) card or a modem to provide a data communication connection to a corresponding type of telephone line. As another example, communication interface 1109 may be a local area network (LAN) card to provide a data communication connection to a compatible LAN. Wireless links may also be implemented. In any such implementation, communication interface 1109 sends and receives electrical, electromagnetic or optical signals that carry digital data streams representing various types of information.

Network link 1120 (FIG. 5) typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1109, which carry the digital data to and from computer 100, are exemplary forms of carrier waves transporting the information.

Each of computers 100, 150 (FIG. 5) can send messages and receive data, including program code, through the network(s), network link 1120 and communication interface 1109. In the Internet example, another server computer 1100 might transmit information retrieved from a table 103 (FIG. 1) through Internet 1124, ISP 1126, local network 1122 and communication interface 1109. The instructions for performing the operations or acts of FIGS. 1, 2A, 2B and 4 may be executed by processor 1105 as they are received, and/or stored in storage device 1110, or other non-volatile storage for later execution. In this manner, computer 100 may additionally or alternatively obtain instructions and any related data in the form of a carrier wave from computer 150.

Note that FIG. 5 is a very low-level representation of many hardware components of a computer system. Several embodiments have one or more additional software components in main memory 1106. In addition to main memory 1106, computer 100 may include one or more other types of memory such as flash memory (or SD card) and/or a hard disk and/or an optical disk (also called "secondary memory") to store data and/or software for loading into memory 1106 (also called "main memory") and/or for use by processor(s) 1105.

Each of computers 100, 150 further includes output logic that makes the data in compiler 110 available to a user via a graphical user interface 130 that generates a screen on a video monitor display 1112. In one example, the output logic of computer 100 provides results via a web-based user interface that depicts in a browser, information related to generation and use of a table mapping operational codes to lists of values of control signals of an ALU, as illustrated in FIGS. 1, 2A, 2B and 4. Additionally and/or alternatively, screens responsive to a command in a command-line interface and display on a video monitor may be generated by computer 100.

In some embodiments of computer 100, functionality in the above-described operations or acts of FIGS. 1, 2A, 2B and 4 is implemented by one or more processor(s) 1105 executing software in memory 1106 of computer 100, although in other embodiments such functionality is implemented in any combination of hardware circuitry and/or firmware and/or software in computer 100. Depending on the embodiment, various functions of the type described herein may be implemented in software (executed by one or more processors or processor cores) or in dedicated hardware circuitry or in firmware, or in any combination thereof. Accordingly, depending on the embodiment, any one or more of the means for performing operations or acts of FIGS. 1, 2A, 2B and 4 can, but need not necessarily include, one or more microprocessors, embedded processors, controllers, application specific integrated circuits (ASICs), digital signal processors (DSPs), multi-core processors and the like.

Any non-transitory computer readable medium tangibly embodying software (also called "computer instructions") may be used in implementing one or more acts or operations described herein and illustrated in FIGS. 1, 2A, 2B and 4. Such software may include program codes stored in memory 1106 and executed by processor 1105. Memory 1106 may be implemented within or external to processor 1105, depending on the embodiment. When implemented in firmware and/or software, logic to perform one or more acts or operations of FIGS. 1, 2A, 2B and 4 may be stored as one or more computer instructions or code on a non-transitory computer-readable medium.

In some embodiments, a computer 150 may include multiple processors 1105, each of which is programmed with software in a memory 1106 shared with each other to perform acts of the type described above to implement the individual tools illustrated in hardware flow 230 of FIG. 2B. For example, a first processor 1105 in computer 150 may be programmed with software in memory 1106 to implement a synthesis tool 231. A second processor 1105 in computer 150 may be programmed with software in memory 1106 to implement a place and route tool 232. A third processor 1105 in computer 150 may be programmed with software in memory 1106 to implement a timing and verification tool 233. A fourth processor 1105 in computer 150 (or alternatively in computer 100) may be programmed with software in memory 1106 to implement a compiler 110. A first processor 1105 in computer 100 may be programmed with software in memory 1106 to implement a graphical user interface 130. A second processor 1105 in computer 100 may be programmed with software in memory 1106 to implement a compiler 110. A third processor 1105 in computer 100 may be programmed with software in memory 1106 to implement an FPGA programmer 124.

Although various processors 1105 have been just described for some embodiments to implement the respective means, in other embodiments a single processor 1105 may be used in a time shared manner to implement the just-described means of computer 100 or of computer 150. Furthermore, although processors 1105 have been described above for certain embodiments as being included in a single computer 100 or in another computer 150, in other embodiments multiple such processors 1105 may be included in multiple computers 100, 150, for example three different computers may implement the three software pieces 110, 130 and 124 described above in computer 100 and three more computers may implement the three software pieces 231, 232 and 233 described above in computer 150.

Numerous modifications and adaptations of the embodiments described herein will become apparent to the skilled artisan in view of this disclosure.

Thus, one or more computer(s) of the type described herein are programmed in some embodiments to use instructions in a source form of end-user software 101, to repeatedly select a list of values of control signals from a design 102 of a processor (e.g. by incrementally processing each instruction in the end-user software 101 sequentially, from the beginning to the end thereof), repeatedly identify a value of an operational code not assigned to any list of values of control signals (e.g. by initially assigning the value 0, and incrementing this value by 1 each time an unused value of the operational code is needed, until completion of processing of the end-user software), and repeatedly storing in a data structure (e.g. a table or a linked list) in computer memory, an assignment of a value of the operational code to a corresponding list of values of control signals, wherein each of (or alternatively, any one or more of) the repeatedly using, the repeatedly identifying and the repeatedly storing are performed automatically, in the one or more computers. A specific manner in which each of the using, the identifying and the storing are performed can be different, depending on the embodiment. In some embodiments, the just-described steps in this paragraph are performed to customize a design of a microprogrammed processor wherein the operational code values stored in the data structure are for microopcodes, while in other embodiments such steps are performed to customize a design of a processor that is not microprogrammed wherein the operational code values stored in the data structure are for macroopcodes. Regardless of whether the processor in the design is microprogrammed or not, a binary form of the end-user software is generated automatically by a compiler of several embodiments, based on operational code values stored in the data structure, and this binary form is subsequently executed by a customized processor synthesized by use of the customized design (e.g. which may or may not include circuitry designed to generate a Huffman code, depending on whether or not end-user software 101 contains instructions to generate the Huffman code). A customized design is obtained in several embodiments by use of operational code values stored in the data structure. Although in many embodiments, the using, the identifying and the storing described in this paragraph are performed automatically without user input, in other embodiments user input is used to perform one or more of these steps. For example, although values of an operational code are assigned automatically to lists of values of control signals without user input in the assignment in most embodiments, alternative embodiments use user input in the assignment, e.g. use user input to guide mapping a value of the operational code to a specific list of values of control signals (which may be identified to a user based on a mnemonic associated therewith, as per table 102T). Although lists of values of control signals are selected automatically in certain embodiments, other embodiments use user input to guide an order in which the lists of values of control signals are selected, based on end-user software. While some embodiments implement a customized processor in an FPGA, other embodiments implement the customized processor in an application specific integrated circuit (ASIC).

Numerous modifications and adaptations of the embodiments described herein are encompassed by the attached claims.

The invention claimed is:

1. A computer-implemented method comprising:
   receiving as input in one or more computers, a mnemonic comprised in an instruction in end-user software;
   using at least the mnemonic in the end-user software, to select a list of values of control signals from a design of a processor;
   identifying a new value of an operational code not assigned to any list of values of control signals; and
   storing in a data structure in memory, an assignment of the new value of the operational code to the list of values of control signals selected by use of at least the mnemonic in the end-user software;
   wherein the using, the identifying and the storing are performed in the one or more computers.

2. The computer-implemented method of claim 1 wherein:
   an arithmetic logic unit in the processor is designed to perform an operation to at least partially execute the instruction, in response to application of the list of values of control signals selected by use of the mnemonic in the end-user software.

3. The computer-implemented method of claim 1 further comprising:
   prior to the storing, checking whether the list of values of control signals, selected by use of the mnemonic in the end-user software, has assigned thereto in said memory, any value of the operational code.

4. The computer-implemented method of claim 1 further comprising:
   creating a microinstruction and storing the microinstruction in the memory;
   wherein the microinstruction comprises the value of the operational code, and values in one or more fields which are based on values in fields of the instruction in the end-user software.

5. The computer-implemented method of claim 1 wherein:

during the using, automatically performing a look-up of at least another data structure, with the mnemonic in the end-user software as input, to identify said list of values of control signals needed to at least partially perform the instruction comprising said mnemonic in the end-user software.

6. The computer-implemented method of claim 1 further comprising:

prior to the storing, generating a message identifying the mnemonic as previously unused.

7. The computer-implemented method of claim 6 wherein:

the message comprises a request for user input; and the storing is performed in response to receipt of the user input indicating that the mnemonic is to be supported.

8. The computer-implemented method of claim 5 further comprising:

based on the assignment of the value of the operational code to the list of values of control signals selected by use of the mnemonic in said end-user software, generating a description of decode logic to be used with a version of the design of the processor customized for execution of at least said end-user software.

9. One or more non-transitory computer-readable storage media comprising a plurality of instructions that when executed by one or more computers cause the one or more computers to perform a method, the method comprising:

receiving as input in the one or more computers, a mnemonic comprised in an instruction in end-user software;

using at least the mnemonic in the end-user software, to select a list of values of control signals from a design of a processor;

identifying a new value of an operational code not assigned to any list of values of control signals; and storing in a data structure in memory, an assignment of the new value of the operational code to the list of values of control signals selected by use of at least the mnemonic in the end-user software;

wherein the using, the identifying and the storing are performed in the one or more computers.

10. The one or more non-transitory computer-readable storage media of claim 9 wherein:

the processor is designed to perform an operation to at least partially execute the instruction, in response to application of the list of values of control signals selected from the design by use of the mnemonic.

11. The one or more non-transitory computer-readable storage media of claim 9 wherein the method further comprises:

prior to the storing, checking whether the list of values of control signals selected from the design by use of the mnemonic has assigned thereto in said memory, any value of the operational code.

12. The one or more non-transitory computer-readable storage media of claim 9 wherein the method comprises:

creating a microinstruction and storing the microinstruction in the memory;

wherein the microinstruction comprises the value of the operational code, and values in one or more fields which are based on values in fields of the instruction in the end-user software.

13. The one or more non-transitory computer-readable storage media of claim 9 wherein the method further comprises:

during the using, automatically performing a look-up of a data structure, with the mnemonic as input, to identify said list of values of control signals;

wherein the data structure maps each mnemonic in a plurality of mnemonics, directly to one or more lists of values of control signals.

14. The one or more non-transitory computer-readable storage media of claim 9 wherein the method further comprises:

prior to the storing, generating a message identifying the mnemonic as previously unused.

15. The one or more non-transitory computer-readable storage media of claim 14 wherein:

the message comprises a request for user input; and the storing is performed in response to receipt of the user input indicating that the mnemonic is to be supported.

16. The one or more non-transitory computer-readable storage media of claim 9 wherein the method further comprises:

based on the assignment of the value of the operational code to the list of values of control signals selected by use of the mnemonic, generating a description of decode logic to be used with a version of the design of the processor customized for execution of the end-user software.

17. An apparatus comprising one or more computer memories coupled to one or more processors, the apparatus comprising:

means for receiving as input in the apparatus, a mnemonic comprised in an instruction in end-user software;

means for using at least the mnemonic in the end-user software, to select a list of values of control signals from a design of a processor;

means for identifying a new value of an operational code not assigned to any list of values of control signals; and means for storing in a data structure in memory, an assignment of the new value of the operational code to the list of values of control signals selected by use of at least the mnemonic in the end-user software;

wherein the means for using, the means for identifying and the means for storing are comprised in the one or more computers.

18. The computer-implemented method of claim 1 wherein:

the value of the operational code is identified based on a most-recently used value of the operational code.

19. The computer-implemented method of claim 1 further comprising:

prior to the using, receiving the data structure;

wherein the data structure maps a plurality of existing values of the operational code to a corresponding plurality of lists of values of control signals.

20. The computer-implemented method of claim 1 wherein:

the mnemonic is used as input to a first data structure, the first data structure being predetermined in the design to at least map one mnemonic among multiple mnemonics to a corresponding list of values of control signals; and the assignment of the value of the operational code is stored as a new entry in a second data structure, the second data structure mapping a plurality of values of the operational code to a corresponding plurality of lists of values of control signals.

21. The computer-implemented method of claim 1 wherein:

the end-user software is received in the one or more computers.

22. The computer-implemented method of claim 1 wherein:
the end-user software is prepared prior to said using, the end-user software comprising a plurality of instructions including said instruction.

23. The computer-implemented method of claim 1 wherein:
each mnemonic in a plurality of mnemonics is mapped directly to one or more lists of values of control signals.

24. The computer-implemented method of claim 1 wherein:
each mnemonic is not mapped to any operational code ahead of time, prior to performance of the computer-implemented method.

25. The computer-implemented method of claim 1 further comprising:
before the identifying, checking in another data structure in the memory of the one or more computers, whether or not the list of values of control signals selected by use of the mnemonic has assigned thereto any opcode value;
wherein when an answer to the checking is no, the identifying and the storing are automatically performed after the checking; and
wherein when the answer to the checking is yes, a micro instruction is automatically created in the memory after the checking, at least by including therein one or more fields based on the instruction in the end-user software.

26. The computer-implemented method of claim 1 wherein:
the list of values of control signals is selected automatically, during said using.

27. The computer-implemented method of claim 1 wherein:
the new value of the operational code is identified automatically, during said identifying.

28. The computer-implemented method of claim 1 wherein:
the list of values of control signals is selected based at least partially on user input on whether to support the mnemonic.

29. The computer-implemented method of claim 1 wherein:
the new value of the operational code is identified based at least partially on user input to guide an order of selection of the list of values of control signals.

30. The one or more non-transitory computer-readable storage media of claim 9 wherein:
the list of values of control signals is selected automatically, during said using.

31. The one or more non-transitory computer-readable storage media of claim 9 wherein:
the new value of the operational code is identified automatically, during said identifying.

32. The one or more non-transitory computer-readable storage media of claim 9 wherein:
the list of values of control signals is selected based at least partially on user input on whether to support the mnemonic.

33. The one or more non-transitory computer-readable storage media of claim 9 wherein:
the new value of the operational code is identified based at least partially on user input to guide an order of selection of the list of values of control signals.

\* \* \* \* \*